(12) United States Patent
Stephens

(10) Patent No.: US 6,277,020 B1
(45) Date of Patent: Aug. 21, 2001

(54) METHOD AND APPARATUS FOR REMOVING MEAT FROM POULTRY CARCASSES

(75) Inventor: Anthony David Stephens, Wilmslow (GB)

(73) Assignee: Filar Limited (GB)

(*) Notice: Subject to any disclaimer, the term of this patent is extended or adjusted under 35 U.S.C. 154(b) by 0 days.

(21) Appl. No.: 09/445,488

(22) PCT Filed: Jun. 9, 1998

(86) PCT No.: PCT/GB98/01684

§ 371 Date: Dec. 8, 1999

§ 102(e) Date: Dec. 8, 1999

(87) PCT Pub. No.: WO98/56254

PCT Pub. Date: Dec. 17, 1998

(30) Foreign Application Priority Data

Jun. 11, 1999 (GB) .................................................. 9712015

(51) Int. Cl.⁷ .................................................. A22C 17/02
(52) U.S. Cl. ........................... 452/135; 452/165; 452/169
(58) Field of Search .................................. 452/165, 169, 452/170, 135, 154

(56) References Cited

U.S. PATENT DOCUMENTS

| | | | |
|---|---|---|---|
| 3,942,222 | 3/1976 | Strandine et al. | 452/165 |
| 4,407,046 * | 10/1983 | Wright | 452/165 |
| 4,627,007 | 12/1986 | Muschany | 364/550 |
| 4,648,155 * | 3/1987 | Burnett | 452/169 |
| 4,935,990 * | 6/1990 | Linnenbank | 452/169 |
| 5,312,291 * | 5/1994 | van den Nieuwelaar | 452/165 |
| 5,368,520 | 11/1994 | Koch et al. | 452/165 |
| 5,407,383 | 4/1995 | Diesing et al. | 452/169 |
| 5,411,434 * | 5/1995 | McGoon | 452/165 |
| 6,007,416 * | 12/1999 | Janssen et al. | 452/165 |

FOREIGN PATENT DOCUMENTS

| | | |
|---|---|---|
| 0489984 | 6/1992 | (EP) . |
| 0695506 | 2/1997 | (EP) . |
| 813814 | 12/1997 | (EP) . |
| 2593675 | 8/1987 | (FR) . |
| 2694515 | 2/1994 | (FR) . |
| 6324006 | 11/1994 | (JP) . |
| 9721352 | 6/1997 | (WO) . |

* cited by examiner

*Primary Examiner*—Willis Little
(74) *Attorney, Agent, or Firm*—Baker Botts, LLP

(57) ABSTRACT

There is disclosed a procedure for use in deboning poultry comprising locating the prepared poultry carcass with its wingbones (12) clamped on wingbone rests (13) defining edges which abut the wingbones at their wing joint (11a) ends whereby the wingbones are securely held in fixed positions with the carcass (11) depending therefrom, defining cutting axes between the wingbones and triosseum junctions and cutting on said axes to sever tendons and ligaments.

57 Claims, 15 Drawing Sheets

METHOD AND APPARATUS FOR REMOVING MEAT FROM POULTRY CARCASSES

This invention relates to deboning poultry, that is to say, removing white meat from poultry carcasses.

The deboning of poultry, particularly chickens, is done, on a large scale, both manually, by more or less skilled workers, and mechanically. Examples of mechanical deboning systems are to be found in FR 2 593 675, EP 0 695 506 and EP 0 489 984.

A problem with mechanical deboning is that poultry come in different weights and sizes, and a measure of control is needed to accommodate this variability, particularly in regard to the step of cutting ligaments and tendons connecting muscle and bone. Various accommodation techniques have been proposed, including weighing the carcass and imaging the carcass using information so derived to decide where to cut.

JP 6324006 (Snow Brand Milk Products Co. Ltd) proposes for general automatic butchering to use X-rays to determine the positions of muscle, tendon and skeleton.

In WO 97/21352 is proposed a method of removing meat from a poultry carcass comprising determining the relative positions of the carcass and severing means thus causing the severing means to sever tendons by which the meat is attached to the skeleton and further comprising locating automatically at least one datum point on the carcass and automatically moving the severing means and the carcass into engagement in a manner determined by the position of the datum point.

One datum point particularly mentioned in that application is the triosseum canal through which run several important tendons, the cutting of which frees up a large part of the muscle to be stripped cleanly from the skeleton manually or by existing mechanical methods.

The datum point (or points) can be determined by X-ray imaging using machine vision techniques to identify image features. It is preferable to use a three-dimensional image for precise location of the triosseum canal.

Techniques described in WO 97/21351 facilitate rapid location of the triosseum canals for rapid orientation of the cutters and rapid and accurate severing of the tendons, freeing up the meat for clean removal, without damage, as high quality, high value meat with a higher yield than other mechanical techniques and even better than conventional manual deboning.

The present invention, however, further improves upon the methods generally described in WO 97/21351.

The invention comprises a procedure for use in deboning poultry comprising locating the prepared poultry carcass with its wing bones clamped on wing bone rests defining edges which abut the wing bones at their wing joint ends whereby the wing bones are securely held in fixed positions with the carcass depending therefrom, defining cutting axes between the wing bones and triosseum junctions, and cutting on said axes to sever tendons and ligaments.

The cutting axes may be defined automatically by reference to a machine vision image, which may be an X-ray image as described in WO 97/21351 which can be a two-dimensional format or scanning image because of the way the carcass is located. As before, the cutting means may be automatically actuated to cut along the axes defined, and rotary blades could be used.

The wing bone rests may be arranged to hold the wing bones relatively inclined so as to include an angle less than 180° on the side of the carcass, an angle, perhaps, of 90°, though holding them parallel (an inclined angle of zero degrees) is entirely satisfactory.

The wing bone rests may be relatively adjustable to accommodate different carcass sizes, and may be adjusted towards each other after the wings are placed thereon so as to be spaced as closely as the intervening wing joint region of the carcass will allow, the wings being then clamped and, subsequently, the wing bone rests pulled apart to stretch the joints. In this way the tendons and ligaments are available for imaging and cutting by incision between wing bones and triosseum junctions with no fear of displacement under cutting forces.

However, the use of X-rays is problematical in a factory environment and advantage can be taken of the method of locating the carcass to dispense with the need for depth information in regard to certain internal features to be severed or not severed as the case may be by noting that, for a given weight range of carcass, the three dimensional positions of these internal features can be calculated to lie within certain narrow limits. For birds in a 2:1 weight range, distances between identifiable features will vary over a range $2^{1/3}$:1 or approximately 1.25:1. Using the techniques of the present invention the three dimensional positions of critical internal features can be determined from two dimensional information obtainable from surface features or readily exposed subcutaneous features without the use of X-rays.

Moreover, these procedures greatly facilitate manual deboning, so that while adapted for automatic cutting using machine vision, considerable advantages are gained by using them in manual deboning.

More particularly, the invention comprises a method for removing meat from poultry carcasses to which wings are attached by muscles, ligaments and tendons at wing joints, comprising:

supporting the carcass to depend from its wing joints with the wings clamped to wing bone rests either side of the carcass affording fulcrums for the wing bones;

placing the wing bone rests under separation force to tension the ligaments and tendons at the wing joints;

cutting in a first cut selected muscles, ligaments and tendons permitting the supports further to separate to open out the wing joints whereby to reveal further muscles, ligaments and tendons;

locating such further muscles, ligaments and tendons and cutting in a second cut selected ones thereof; and completing the removal process by pulling the wings from the carcass and removing freed muscle therefrom.

While rotary blades, as noted above, are suitable, it is now found that greater precision, resulting in less collateral damage to the carcass and consequently improved quality of product as well as improved yield, can be achieved if the first and second cuts are effected using oscillating blade means. While the use of higher frequencies is possible, it is found that frequencies between 1 and 150 Hz are suitable, with an amplitude of oscillation in the range 1–10 mm. The oscillation may be primarily an oscillation lengthwise of a substantially straight blade edge. Such low frequency oscillation reduces or eliminates any occurrence of vibration induced white finger (VWF) as compared to higher frequencies. While regular knives could be used, it is now found that special blades can effect the cuts through muscle, tensioned tendon and ligament without cutting bone—the presence of bone fragments in fillets is highly undesirable. Such blades are between 1 and 2 mm thick at the cutting edge, with edge faces including an angle between 30° and 70°—not classically sharp.

The separation force may be arranged to be, at any stage of the cutting, sufficient to tension any muscle, tendon or ligament to be cut ahead of any other and, such muscle, tendon and/or ligament having been cut, to separate the wingbone rests to open up the wing joints revealing further ligament, tendon and muscle facilitating further cutting. For poultry in the weight range 1.2–2.4 Kg eviscerated weight, the separation force may be between 3 and 4 Kg, typically 3.5 Kg.

Because of the need to tension successively the ligaments and tendons prior to their being severed, it is advantageous to carry out two separate cutting operations (using plane blades)

a first cut to sever the L1 and T1 and the propatagium a second cut to sever T2, L2 and the deltoidus major Both of these cuts may be either manual or by automatic means.

Two other cutting operations, a cut adjacent to the wishbone to part it from the Pectoralis thoracicus and a cut to part the Scapulohumeralis from the scapula may either be carried out manually or, by using more complex blades, may be effected as part of the first and second cuts respectively.

When the first cut is to be effected automatically, it is made at a predetermined distance from each of the respective fulcrums with blade means aligned transversely to a line joining the fulcrums. For poultry in the aforementioned weight range, the predetermined distance should be 7–9 mm say 8 mm.

For the aforementioned weight range, the first cut should be terminated when the blade has descended to a height of 15 mm above the fulcrums. With the blade in this position, the ligament L1 will have been completely severed and a fissure of 5–10 mm will have opened in the wing joint.

When the first cut is to be effected manually, the blade is positioned approximately 5 mm ahead of the front edge and 5 mm in from the end of the propatagium.

The incision which results from the first cut greatly facilitates the positioning of the blade which is to carry out the second operation.

Image analysis, including the use of an edge detection algorithm, on the fissure in the wing joint itself and the anatomical features revealed below—such as the ligament L2—may be used to determine the optimum position for the second cut.

As for the first cut, the second cut is terminated when the blade reaches a predetermined height above the fulcrums—a height of 5 mm being appropriate to guarantee that the required severing operations have been effected.

In any event, whether in a manual or an automatic operation, the carcass may be moved on the wingbone rests on a conveyor to and from a cutting station. The conveyor may move the wingbone rests from a loading station through a cutting station to an unloading station.

The wings and carcass may be manipulated at the unloading station to separate muscle freed by the cutting operation from the carcass. Separation of meat from the carcass may be completed manually at the unloading station.

A carcass may be prepared for cutting, e.g. at a loading station, by removing the skin around the triosseum junction, and blade cuts may be effected down the scapula to separate the scapulohumeralis—using the apparatus this becomes a relatively easy cut to make manually and simplifies later procedures since it does not need to be done during the second cut.

The invention also comprises a mounting for use in deboning poultry comprising a support for a prepared carcass comprising wing bone rests adapted to receive outstretched wings of a carcass and clamp means clamping the wings to the wing bone rests.

The wing bone rests may define edges against which the wing joints can abut which edges may have variable spacing to accommodate different carcass sizes. The wing bone rests may be adjustable towards and away from each other for this purpose. The wing bone rests may comprise tables with upstanding walls on and against which the wings are located for clamping. The upstanding walls of the right and left wing bone rests may be coplanar, as may the right and left tables, but it may be preferred to have the latter relatively inclined away from each other at an angle less than 180°.

A poultry deboning arrangement according to the invention may comprise a loading station at which poultry is loaded on to mounting apparatus as above described, an imaging arrangement in which a machine vision image of the loaded poultry is made, a control arrangement defining cutting lines based on the machine vision image, a cutting station at which tendons and ligaments are severed on the cutting lines, and an unloading station at which the thus severed carcasses are unloaded from the mounting apparatus. The deboning arrangement may then include a stripping arrangement stripping muscle from the cut carcasses.

However, the mounting apparatus may be useful per se in connection with a manual deboning procedure, the apparatus being a more secure and convenient means of holding poultry in a correct cutting position to sever important tendons and ligaments in one or two cutting actions each side of the bird quickly, efficiently and accurately for maximum meat yield.

In a mechanical arrangement, the carcass on the wing rests may be conveyed through an imaging station to a cutting station, and this may be followed by an automatic stripping operation.

More particularly, apparatus for use in deboning poultry comprising a support for a prepared carcass comprising wingbone rests adapted to receive outstretched wings of a carcass and clamp means clamping the wings to the wingbone rests.

The left and right wingbone rests may comprise vertically oriented plates, L-shaped in plan section, standing back-to-back. At least one of the rests may be slidable on a base.

Said separation force means may comprise fluid pressure operated piston-in-cylinder arrangements.

The clamp means may be located on the wingbone rests—between 30 and 35 mm below the fulcrum on the face of the "upright" of the L-section remote from the other L-section—this accommodates, all birds within the 1.2–1.4 Kg weight range.

The apparatus may comprise, between the wingbone rests a "cone" on which the carcass is placed serving to locate it for positioning and clamping of the wings. The "cone" may be elevatable whereby to rotate the wing joints after the severing operation to separate freed muscle from carcass. The "cone" may be mounted on a lever arrangement with a fluid pressure operated elevating arrangement.

The apparatus may be adapted for automatic cutting, comprising blade means and blade guidance means.

The blade means may comprise oscillating blade means, which may comprise straight cutting edges oscillating lengthwise and be adapted to cut muscle, tendon and ligament under tension, but not bone. The blades may be between 1 mm and 2 mm thick at the cutting edge which may have faces including an angle between 30° and 70°, being essentially blunt. A thin sharp ridge may however project about 1 mm from the apex of the faces which may assist cutting but which, if it encounters bone, will not penetrate sufficiently to detach bone fragments that would mar the quality of the meat.

The blades may be reciprocated—at between 1 and 150 Hz (or higher frequency, though that is seemingly unnecessary and lower frequencies are more tolerable, being less likely to result in VWF).

Either a single blade or double out-of-phase reciprocating blades similar to the familiar domestic electric carving knife may be used. The advantages of the double acting arrangements are resulting machine (acutator and blades) is dynamically balanced the horizontal reaction forces on the blades which result from the interaction with the carcass are out of phase and transmit a zero net force back to the machine The combination of these two factors enables a machine which produces oscillatory motion to be hand held without the fear of VWF.

While blade mean as described have been devised expressly for use in the methods and apparatus for deboning poultry forming the major subject matter hereof, they would have independent utility in connection with any other method for deboning poultry, provided muscle, tendon and ligament were held under tension and, indeed, in the butchery of other carcasses, not to mention other industrial cutting operations e.g. in leather and textiles manufacture. Furthermore, the "blunt" cutting edge, so effective on taut strands and webs, is inherently safe against accidental cutting of relaxed fingers. It is envisaged and reserved that disclosure within the context of this Application may or could give rise to independent protection for such cutting means.

In automatic cutting arrangements hereunder, however, the blades may be carried on adjustable holders for movement in three dimensions above the left and right wingbone rests. The blade guidance means may position blades for a first cut with respect to the positions adopted by the right and left wingbone rests when the carcass is supported in equilibrium. The blades may be aligned with a line bisecting the right and left wing bone rests with their cutting edges 8 mm in toward the carcass measured from the place on the support where the wing is clamped, and the blades are guided down to 15 mm above the fulcrum for the first cut.

The blade guidance means may comprise a inactive vision system, which may image the wing joints after the first cut to determine guidance instructions for automatic control of the cutting means for a second cut. The machine vision system may include a edge detection algorithm arrangement.

The wingbone rest may be on a movable base, the apparatus comprising transport means for the base between loading, cutting and unloading stations, and there may be first and second cutting stations.

Methods and embodiments of apparatus for removing meat from poultry carcasses will now be described with reference to the accompanying drawings, in which.

The following anatomical information will be helpful in understanding the detailed explanation of the methods and apparatus of the invention.

The main muscles (the naming of which in the following description follows the Latin definitions given in The Anatomy of Domestic Animals, Sissons and Grossmont, Vol. 2 W B Saunders & Co, 5th edition with additional colloquial definitions in parentheses) which are harvested for consumption as white meat are those whose purpose is to power flight (see FIG. 2).

Pectoralis thoracicus ("Breast meat")

Supracoracoideus, sometimes known as the Pectoralis profundus, ("Tender").

In order to withstand the very large forces transmitted from these power muscles to the humerus ("wingbone"), a pyramid of bones comes together at the triosseum junction the scapula the coracoid the wishbone In addition to the "power" muscles, three small muscles whose main function is to control the synchronisation of the wing beat are also harvested for white meat subcoracoscapularis ("eye meat")

coracobrachialis scapulohumeralis

Figure 2:
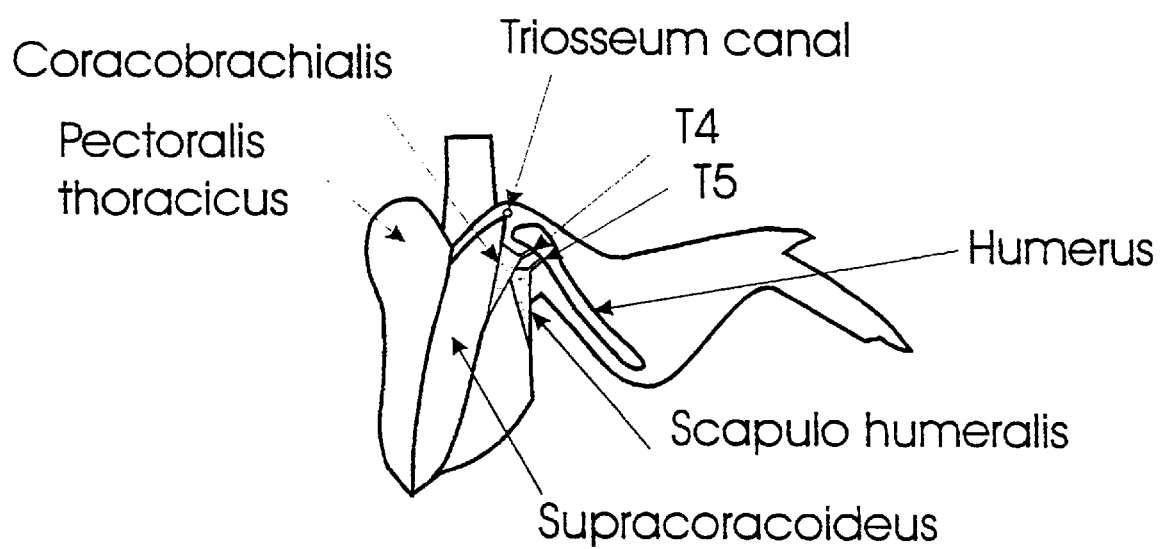
FIG. 2 is a ventral view of the main features of the wing joint.
Figure 3:
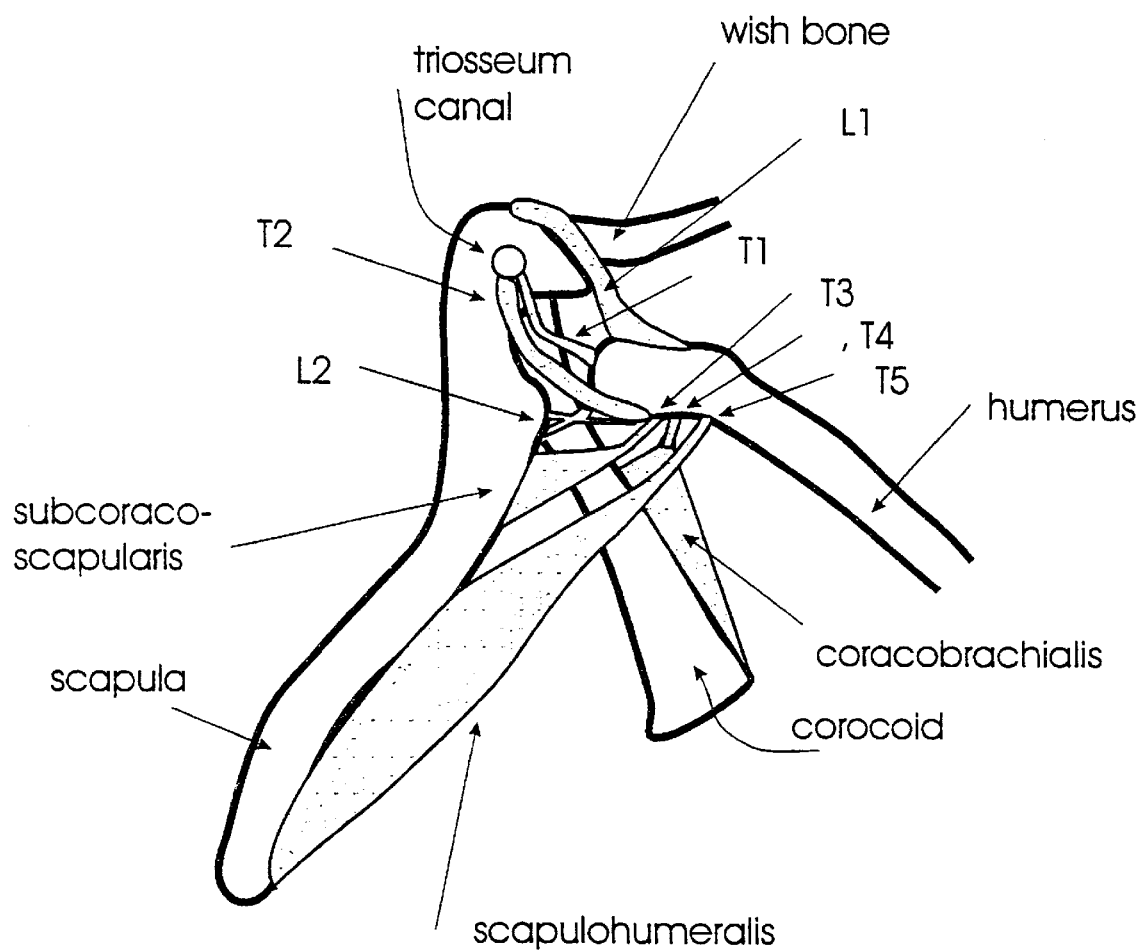
FIG. 3 is a schematic diagram showing bones, tendons, ligaments and control muscles in the region of the wing joint.

These are shown in FIGS. 2 and 3 attached to the wingbone by tendons T3, T4 and T5. Although individually small, together they comprise some 8–9% of the white meat hearvested and make a crucial contribution to the overall economics of chicken deboning.

Also shown on FIG. 3 are the two main ligaments L1 and L2 which keep the wingbone knuckle located in its socket, and a small canal at the triosseum junction known as the triosseum canal, which acts as a pulley for tendons which pass through it.

A favoured method of deboning which is capable of achieving a high meat yield is to sever ligaments L1 and L2 and tendons T1 and T2 but to leave intact tendons T3, T4 and T5. When the wingbone is pulled away from the carcass, both the "power" and "control" muscles stay with the wingbone from which they are subsequently harvested.

The main difficulties with this operation are

L2, T3, T4 and T5 are out of sight, hidden below the wing joint;

L2, which must be severed, lies in close proximity (approximately 5 mm at the closest approach) to T3, T4 and T5, which are to be left intact. If these tendons are inadvertently severed, the attached muscle cannot be harvested;

the required cuts are in close proximity to the bones on either side of the wing joint, with the undesirable possibility of sharp slivers of bone in the product.

The reason for the superiority of the highly trained operative over conventional mechanical means is the ability to use hand eye co-ordinatiuon to "sense" both the position of ligaments and tendons to be cut and to "feel" the progress of the cutting operation. As the tendons/ligaments are severed, the operative is able to "sense" the movement apart of the wing joint and effect fine adjustments to the cutting stroke, thereby avoiding the cutting of adjacent tendons which are to be left intact.

It is to be appreciated however that, to achieve high meat yields, the operative must be able to repeat highly accurate repetitive tasks at speed over long periods—a combination of requirements to which human beings are not in general well suited. In addition to the intrinsic difficulty of the task, the operator must also be able to cope with exposure to low temperatures, a hygiene requirement which leads to operator fatigue.

Conventional mechanical systems have low efficiencies both because they do not have the hand-eye-co-ordination of humans and also because they cannot effect the fine adjustments needed to handle bird to bird variations.

WO 97/21352 teaches uses of a reference datum to adjust the position of severing means in order to cope with this variability. To be useful, a reference datum must be close to the incision points on the ligaments and tendons, so that the offsets of the cuts from the reference datum are at fixed distances and do not vary with bird size. The preferred datum of the co-pending application is the triosseum canal, shown in FIGS. 2 and 3.

Because, to the accuracy which is acceptable for the purpose of cutting, the apparatus positions critical features of the wing joint in predictable relationships to one another, it is only necessary to know accurately the position of one of the features (such as the triosseum canal) to know the positions of all of the other features.

One of the disadvantages of using the triosseum canal is that its position may only be measured by methods such as X-ray, a means which is generally undesirable because of the additional precautionary measures which have to be taken.

It is now found possible to identify topographical features of the carcass which may be viewed directly and which avoid the need for the use X-ray.

Figure 1:
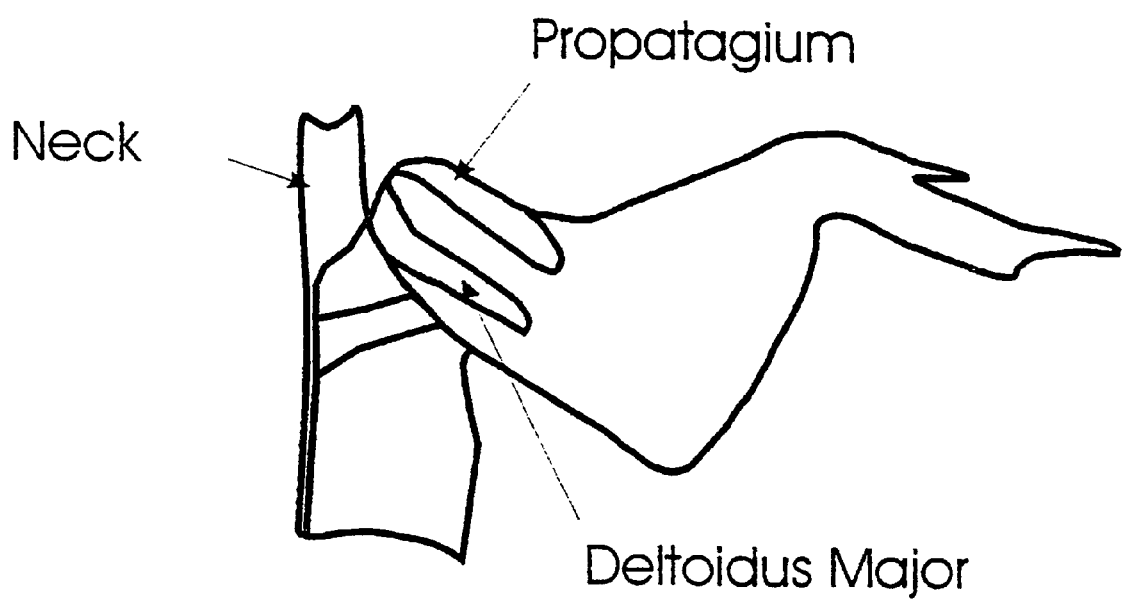
FIG. 1 is a dorsal view of superficial muscles at the wing joint of a poultry carcass.

One such feature is the propatagium—the small muscle that lies along the wing leading edge (see FIG. 1). The end of the propatagium is anchored to the top of the triosseum junction and accurately positioned in the middle of L1 and is a suitable reference point from which the positions of all of the critical features may be calculated.

Whilst the end of the propatagium, which comes into view after the skin has been removed from above the wing joints, is an ideal feature to guide manual operatives in the placement of cutters, it has drawbacks as a method for automatic systems. Here the required machine vision may have difficulty identifying the propatagium if it has been damaged or is partially obscured by fat.

A more robust method for automatic systems is to carry out a preliminary cut to open up the wing joint and then to use the features revealed by this incision into the wing joint to calculate a reference point for subsequent cutting.

It is possible to make such a preliminary cut with only the need to calculate the position of the wingbone support because these wingbone support place the wingbones in predictable positions.

It has already been mentioned that, from the point of view of properly tensioning the ligaments and tendons it is advantageous to carry out two separate cutting operations a first cut to sever L1, T1 and the propatagium, a second cut to sever T2, L2 and the deltoidus major.

It is advantageous to make this first cut the preliminary cut made to prepare the wing joint for imaging, the cutter to effect the second cut being positioned using information which results from that imaging.

An extremely important feature of the wingbone support is that they cause T2 and L2 to be located at known heights above the fulcrums (approximately 10 mm). As a result, the imaging problem has been reduced from the extremely difficult one of determining the feature positions in three dimensions to a much easier one in two dimensions.

The incision created by the first cut provides several features which either singly or in combination may be used as reference datums for the subsequent cuts.

One such feature is the ligament L2 which may be directly viewed at the bottom of the incision.

Another feature is the edge of the incision itself. Because of the depth of the incision it is possible to light the carcass in such a way as to create a deep shadow in the incision—the light rim around the incision standing out well and being easily seen using edge detection. The positions of the lower feature such as L2 and T3 may then be inferred from the shape of the detected edge.

The first operation to be performed on the carcass, whether for manual or automatic processing, is the removal of the skin around the wing joints. This operation is preferably manual. Immediately after the removal of this skin the operative may elect to carry out two further operations which the fixture makes quick and undemanding a cut along the scapula to separate the scapulohumeralis muscle a cut or scrape along the wishbone to separate the pectoralis thoracicus (or breast meat).

Figure 4:
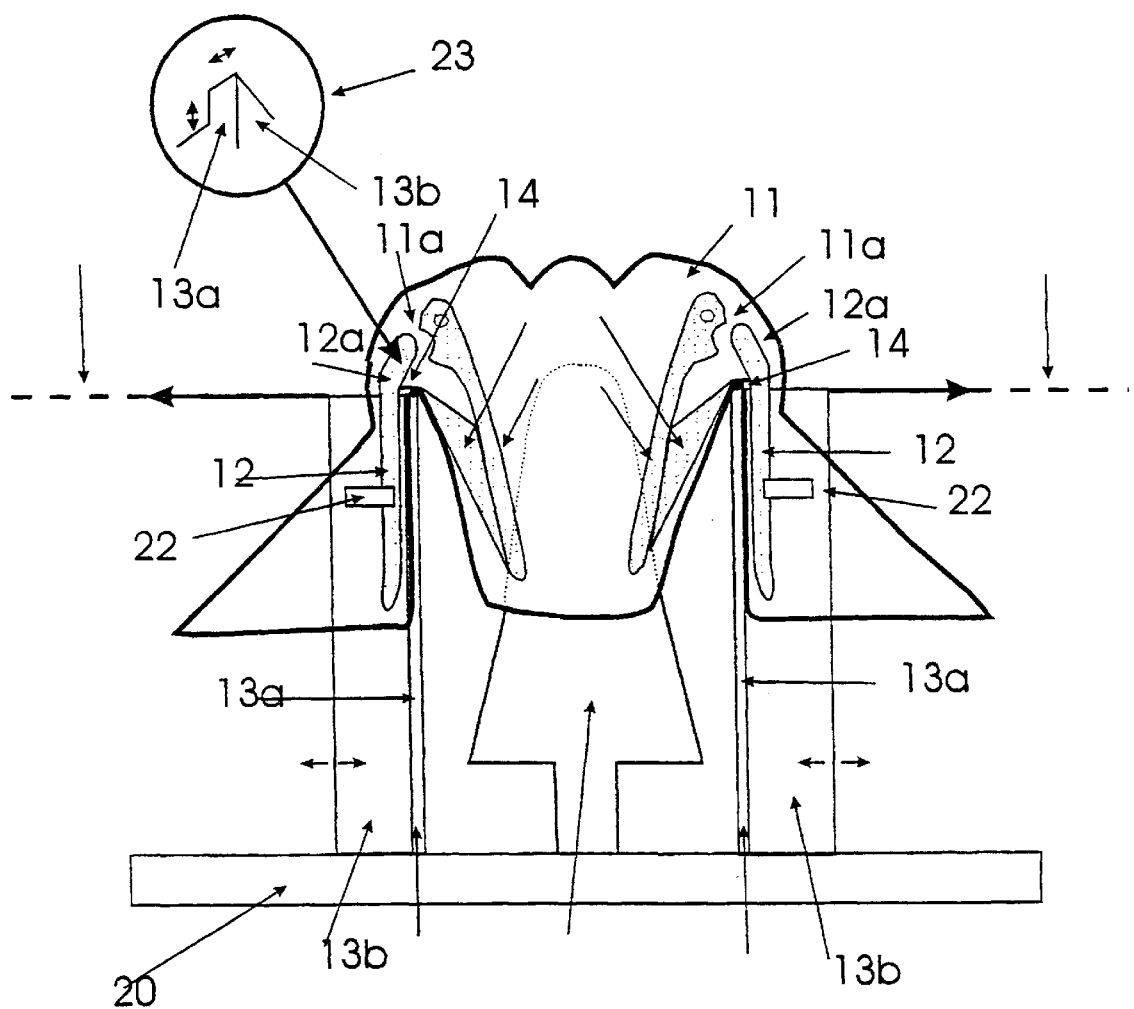
FIG. 4 is an elevation of a support means with a carcass mounted thereon ready for imaging and cutting.
Figure 5:
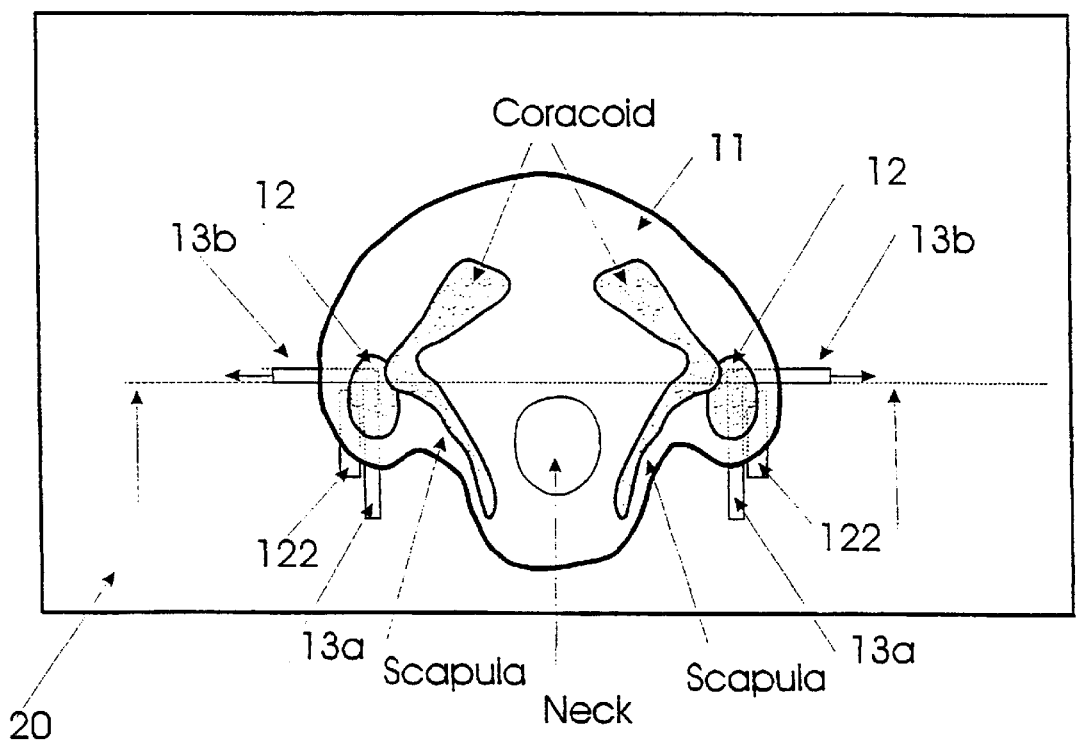
FIG. 5 is a plan view of the support means of FIG. 4, again with carcass mounted.
Figure 6:
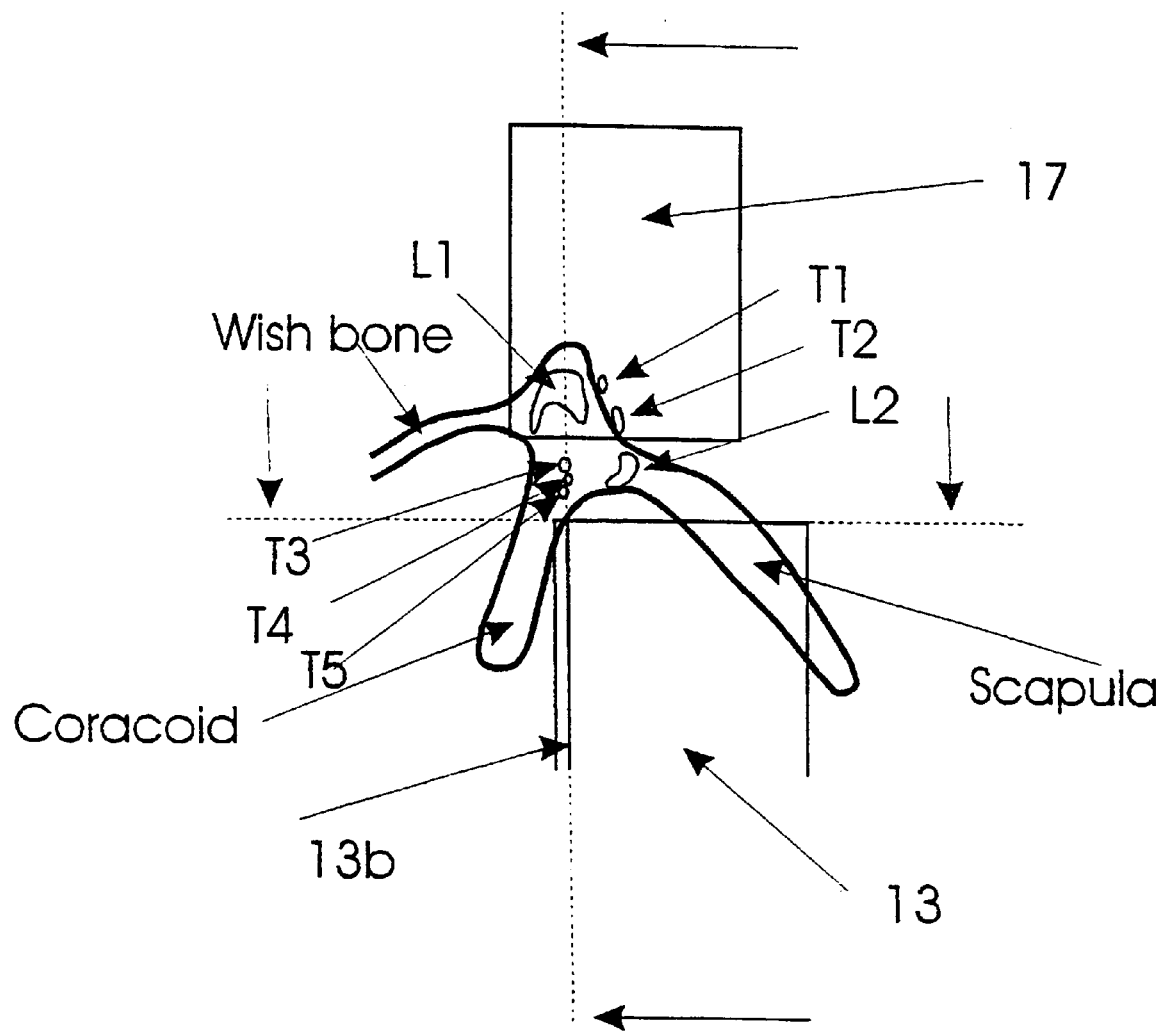
FIG. 6 is an elevation showing cutting means effecting a cutting operation.

Bearing that in mind, the invention as illustrated in the drawings of FIGS. 4 and 5 comprises locating the prepared poultry carcass 11 with its wingbones 12 clamped on wingbone rests 13 defining edges 14 which abut the wingbones 12 at their wing joint ends 12$a$ whereby the wingbones 12 are securely held in fixed positions with the carcass 11 depending therefrom, defining cutting axes (see below) between the wingbones 12 and the triosseum junctions, and cutting on said axes to sever tendons and ligaments.

More particularly, the drawings illustrate a method for removing meat from poultry carcasses 11 to which wings are attached by muscles, ligaments and tendons at wing joints 11$a$ comprising:

supporting the carcass 11 to depend from its wing joints 11$a$ with the wings clamped to wingbone rests 13 either side of the carcass 11 affording fulcrums—edges 14—for the wingbones;

placing the wingbone rests 13 under separation force to tension the ligaments and tendons at the wing joints 11$a$;

cutting in a first cut selected muscles, ligaments and tendons permitting the wingbone rests 13 further to separate to open out the wing joints 11$a$ whereby to reveal further muscles, tendons and ligaments;

locating such further muscles, ligaments and tendons and cutting in a second cut selective ones thereof; and completing the removal process by pulling the wings from the carcass and remaining freed muscle therefrom.

Figure 16:
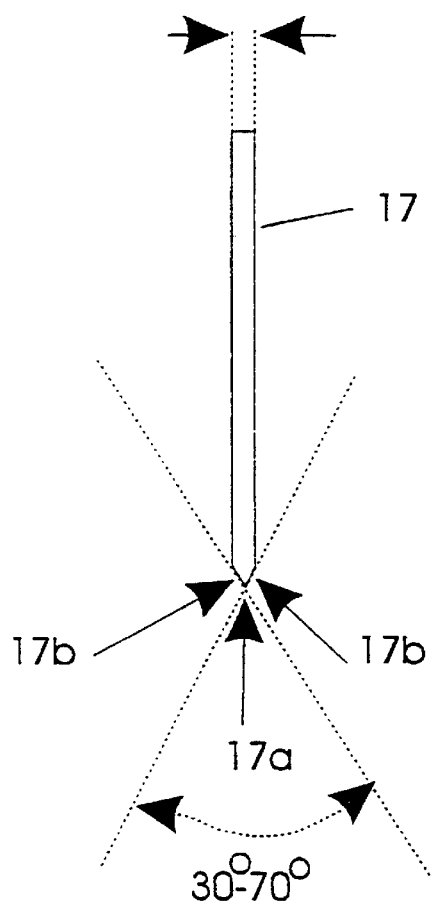
FIG. 16 is an end elevation of a typical cutting blade used in the method of the invention and as seen in side elevation in FIG. 6.
Figure 17:
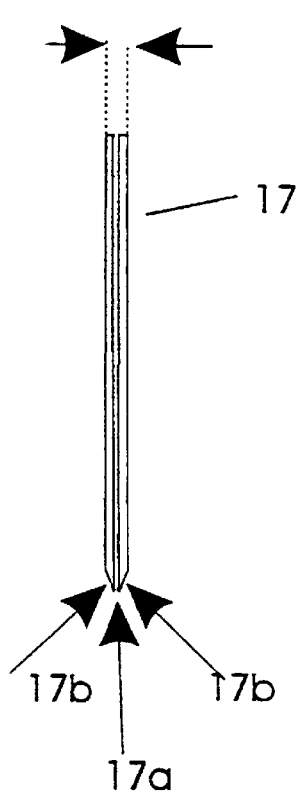
FIG. 17 is an end elevation like FIG. 16 of double out of phase reciprocating blades.
Figure 18:
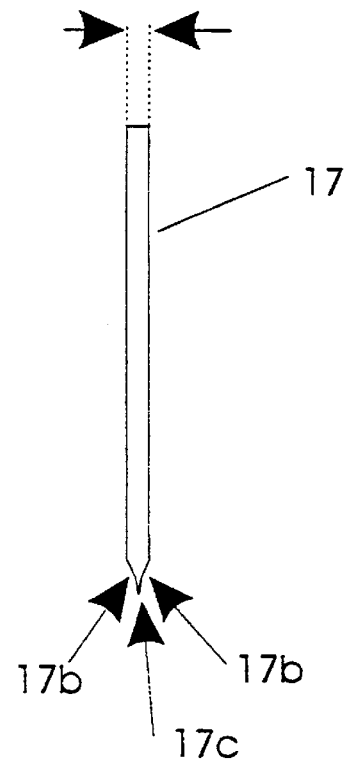
FIG. 18 is an end elevation like FIG. 16 of a modified blade.

The first and second cuts are effected using oscillating blade means 17 illustrated in FIGS. 16, 17 and 18. It is found that by oscillating blades at 1–150Hz, cuts of tensioned muscle, tendon and ligament can be made precisely and safely, without cutting anything that should not be cut. Amplitudes of oscillation of the blades 17 between 1 and 10 mm are found effective, the oscillation being primarily lengthwise of a substantially straight blade edge 17a. If the blade edge 17a is blunt, as by the blade 17 being, say, 1–2 mm thick and the edge faces 17b including an angle between 30° and 70°, the blade reciprocated, will nevertheless cut muscle, tendon and ligament under tension, but not bone. As seen in FIG. 18, a blade 17 having basically a blunt cutting edge 17c can have a thin, shallow, sharp projection 17c that will facilitate cutting, but, while it may penetrate bone to a small extent, will not split off bone fragments that would detract from the quality of the harvested meat. Blades can be oscillated using an electrical mechanism like the familiar electric carving knife or by pneumatic means.

Figure 7:
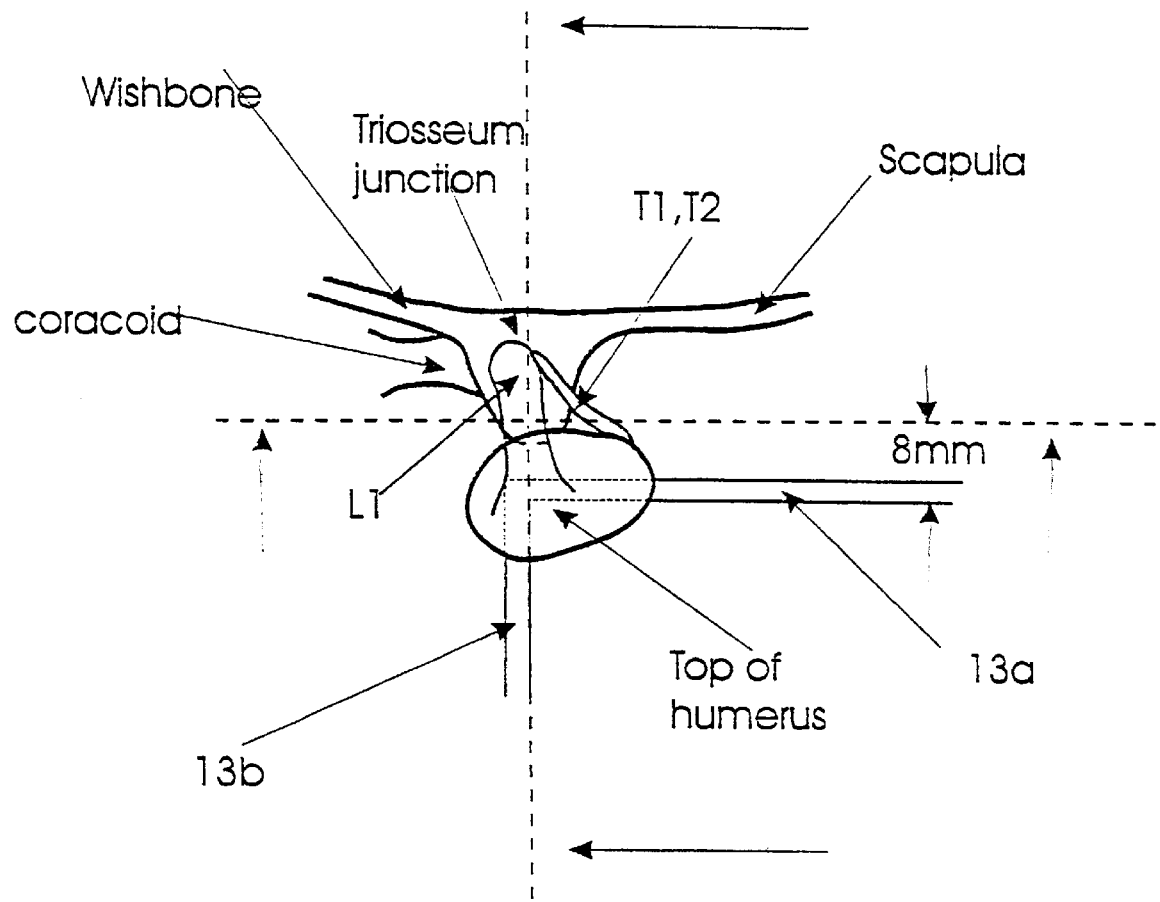
FIG. 7 is a plan view of the wing joint arranged as in FIG. 6.
Figure 8:
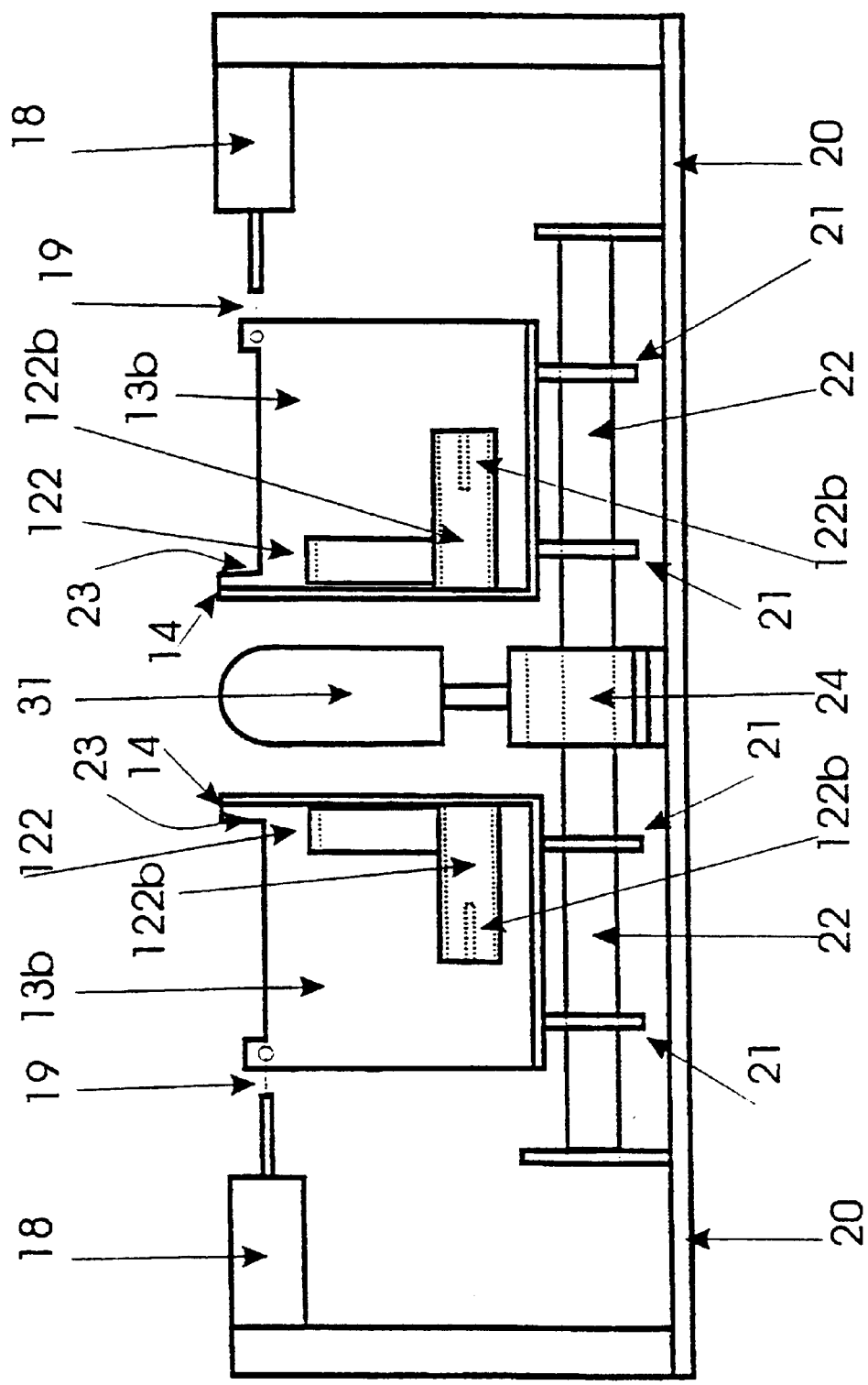
FIG. 8 is a front elevation of a work station including a cutting arrangement.
Figure 9:
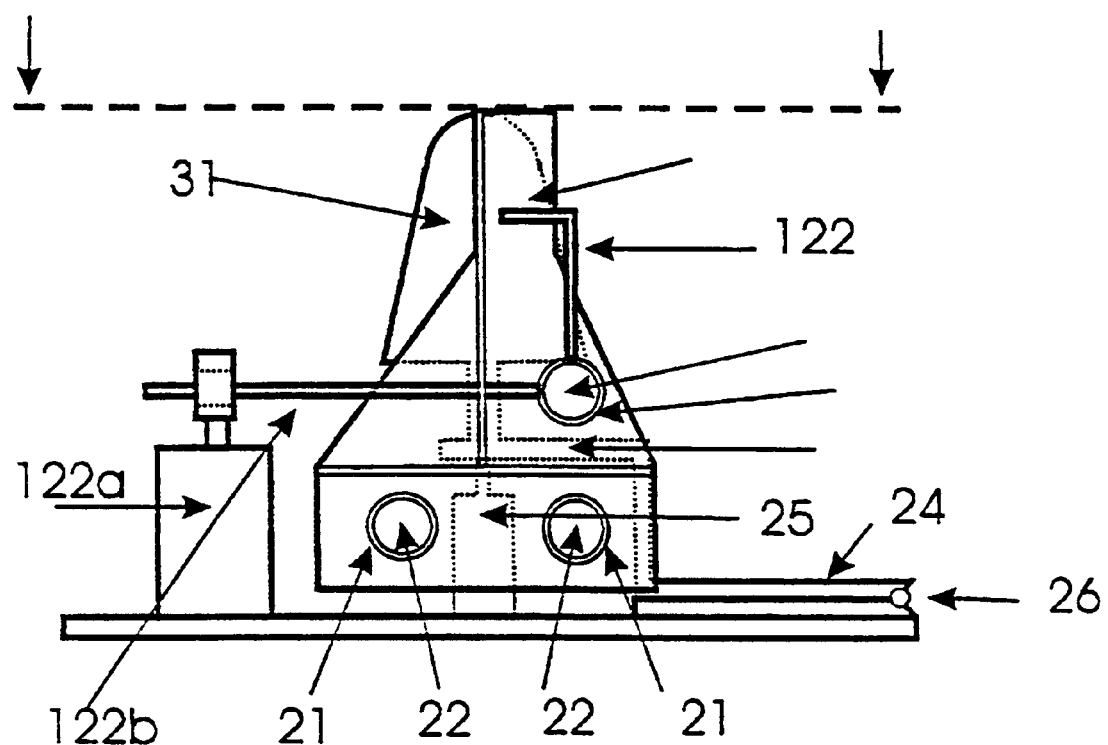
FIG. 9 is a side elevation of the work station of FIG. 8.
Figure 10:
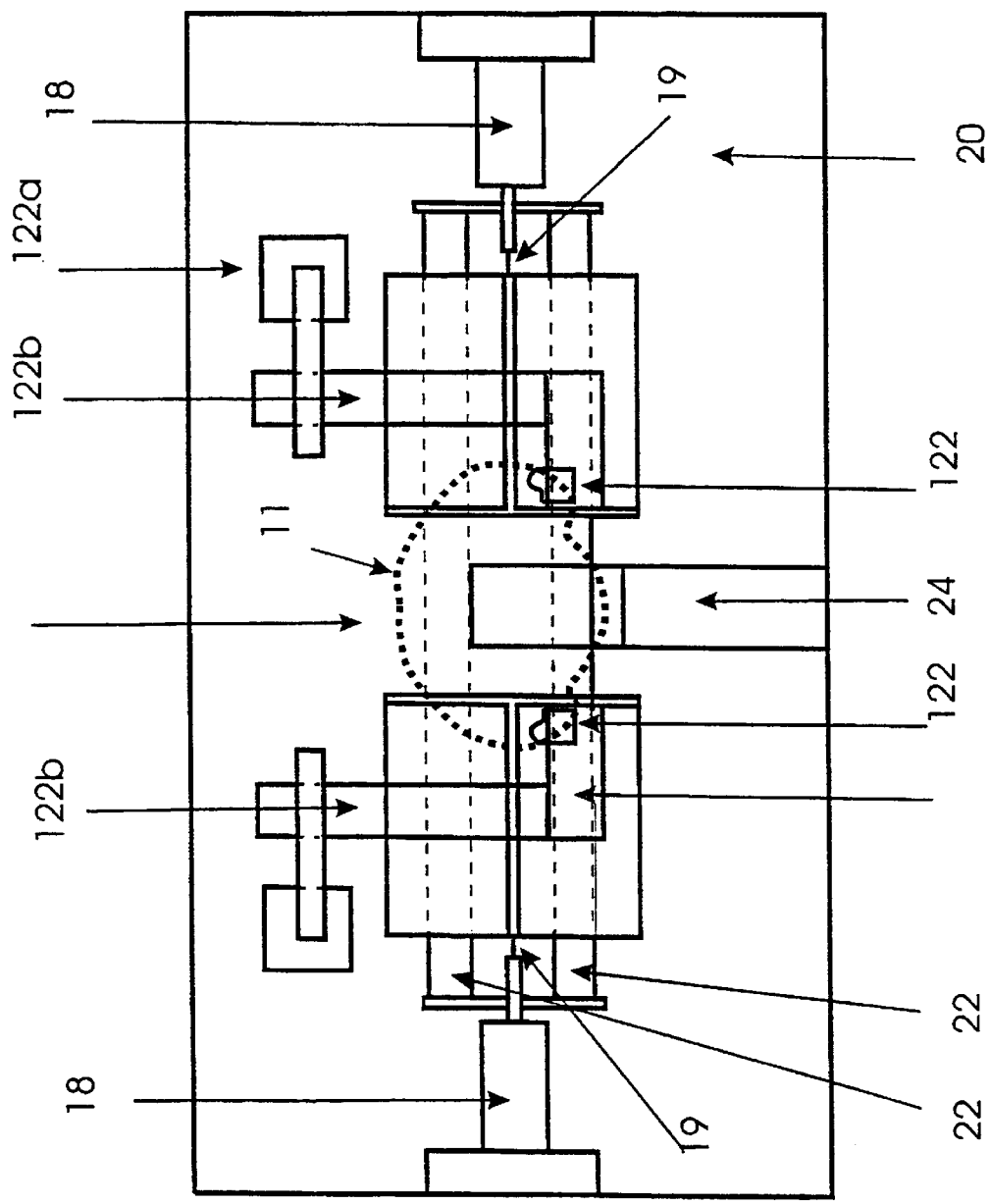
FIG. 10 is a plan view of the work station of FIG. 8.
Figure 11:
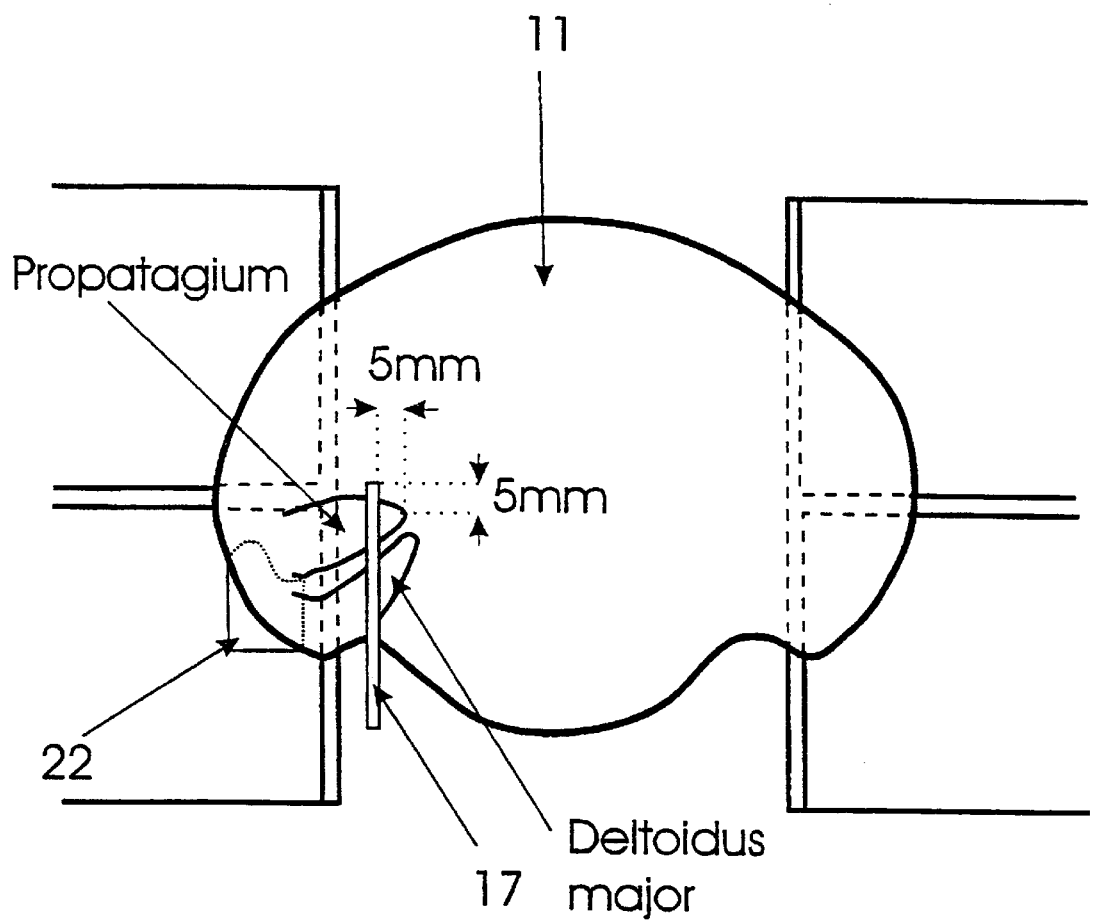
FIG. 11 is a plan view showing features for a manual cutting operation.

In FIGS. 8, 9 and 10 separation force is effected by pneumatic piston-in-cylinder arrangements 18 acting on the wingbone rests 13 through mono filament ties 19. The wingbone rests 13 are carried on bushes 21 slidable on bearer bars 22. The pneumatics are arranged so that the separation force is about 3.5 Kg, which is satisfactory for a range of poultry of eviscerated weight between 1.2 and 2.4 Kg. This separation force tensions certain muscles, tendons and ligaments at the wing joints and locates the carcass in a position which is definitive for those members to be severed so that first cuts can be made at a predetermined distance—8 mm is suitable, as seen in FIG. 7—from the fulcrums 14, the blades 17 being aligned transversely to a line joining the fulcrums 14.

For a manual cutting operation, the first cuts can be made—after the carcass has been prepared by the removal of skin above the triosseum junctions—5 mm ahead of the front edge and 5 mm in from the end of the propatagium. When ligaments L1 have been completely severed, which, for birds in the aforementioned weight range, will be when the blade has been brought down to 15 mm above the height of the fulcrum 14, the tension will open up a fissure between 5 and 10 mm, as seen at X in FIG. 14, which facilitate placement of the blade for the second cut.

By making cuts to this specification, which can be done easily by hand after very little training, or using machine vision simply to locate the positions of the wingbone rests, ligaments L1 can be severed completely, while leaving intact other tendons and ligaments, opening up the wing joints to facilitate a second cut to sever ligament L2 and the deltoidus major while leaving still intact tendons T3, T4 and T5. If the scapulohumeralis is not already manually parted from the scapula in a preparatory step, this can also be done at the second cut.

Figure 14:
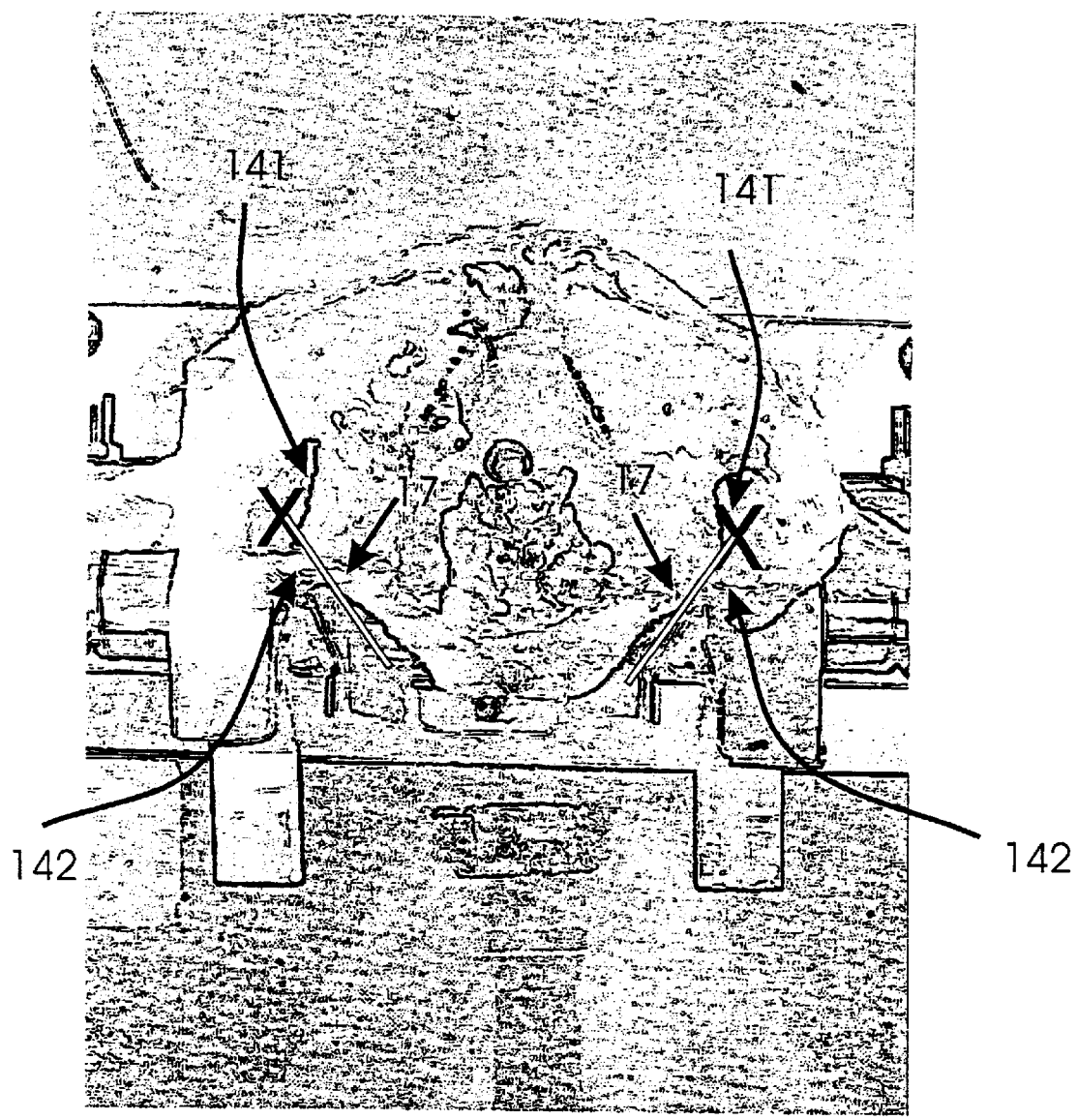
FIG. 14 is a machine vision image showing edge detection and incision guidance.

The use of a machine vision imaging to determine the insertion points for the second cuts is illustrated in FIG. 14. Here the edges 141 of the fissures in the wing joints created by the first cuts are clearly discernible using an edge detection algorithm on an image of the carcass. Placement of the cutters 17 approximately one third of the distance into the fissure guarantees that L2 will be severed whilst T3, T4 and T5 are left intact. Angling of the blade some 45° to the first cut ensures that the maximum amount of the deltoidus major muscle 142 is harvested.

In the apparatus illustrated in FIGS. 8, 9 and 10, the wing joint rests 13 are arranged either side of a "cone" 31, which is like the conventional cone support used in manual deboning but serves here merely as an aid to locating the wingbones 12 against the rests 13. As seen best in FIGS. 5 and 7, the wingbones 12 are located at the intersection of uprights 13a and 13b and clamped there by clamps 122.

An important detail, for the accommodation of larger birds in the range under discussion is a relief 23—see detail in FIG. 4 and FIG. 8—along the top edge of the "bases" 13B of the L-section wing joint rests 13. For larger birds it is found that the Pectoralis thoracicus comes into contact with the tope of "base" 13B, thereby affecting the height at which the critical tendons and ligaments sit with respect to the fulcrums. This unwanted interaction is avoided by the use of the recess.

The "cone" 31 does actually have a further function, being mounted on a lever arm 24 with a piston-in-cylinder arrangement 25 which pivots it on an axis 26 after the cuts have been effected to separate the meat from the carcass that has been freed up by the cuts.

Figure 12:
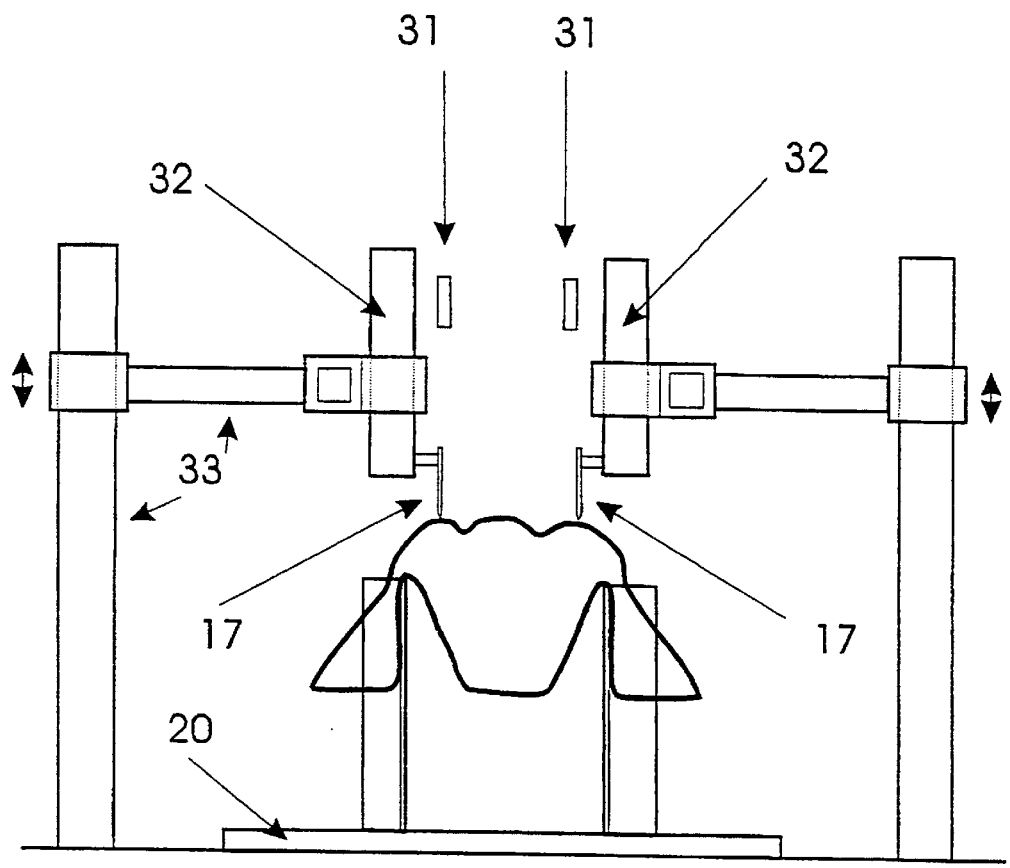
FIG. 12 is a front elevation of an automatic cutting station.
Figure 13:
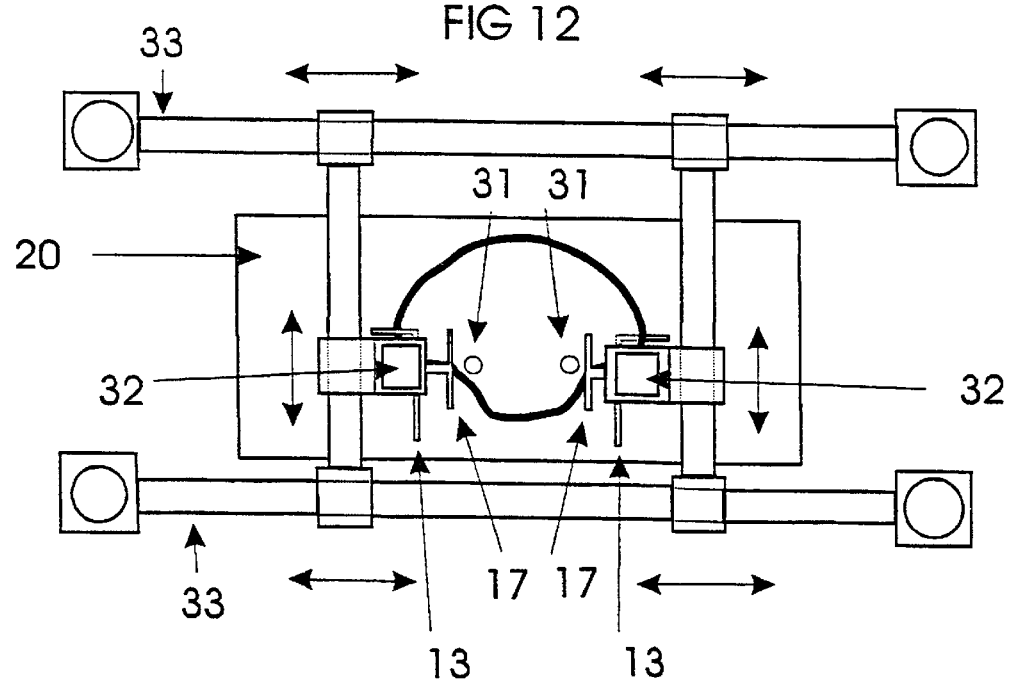
FIG. 13 is a plan view of the cutting station of FIG. 12.

FIGS. 12 and 13 illustrate additions to the basic support arrangement for effecting cuts automatically using machine vision. Cameras 31 image the wing joint areas from above while blades 17 are carried on actuators 32 effecting their oscillation, the actuators 32 being on a gantry arrangement 33 for movement, under instruction from a control arrangement, not illustrated, for movement on three axes to position the blades for and effect the required cuts.

Figure 15:
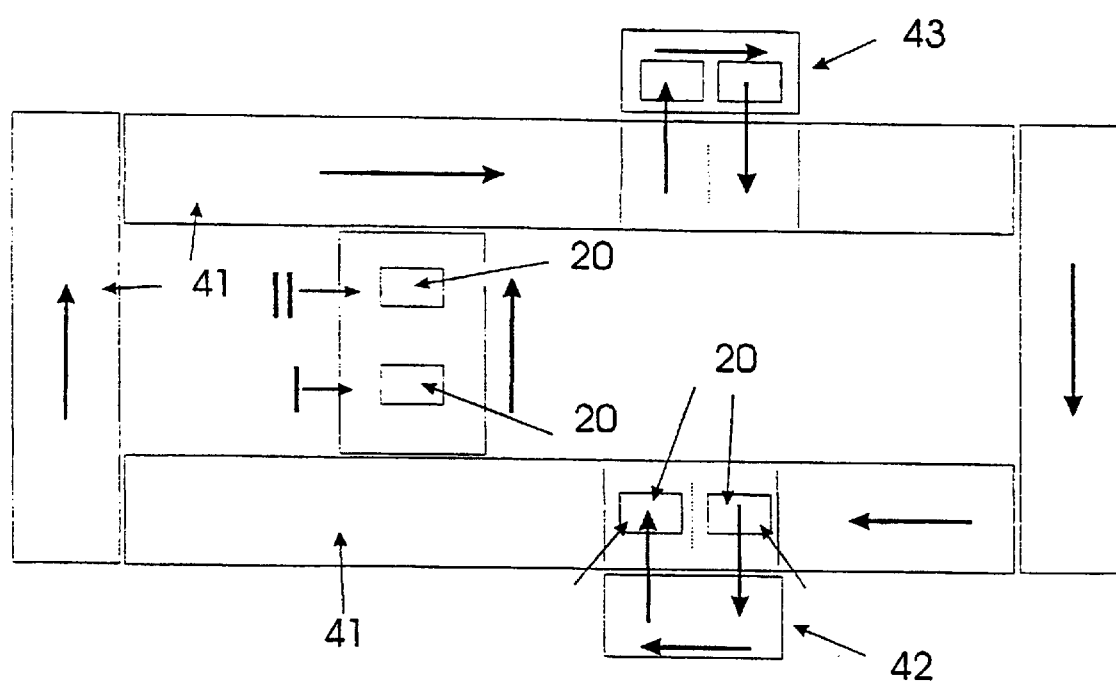
FIG. 15 is a schematic of an automated deboning factory.

The gantry arrangement 33 is located at a cutting station, the support arrangements of FIGS. 8, 9 and 10 on platens 20 being movable through each of two similar cutting stations I and II as seen in FIG. 15 on a conveyor system 41 which includes a loading station 42 and an unloading station 43. At the loading station 42, unloaded platens 20 are moved to a loading table 44 for loading of the eviscerated carcass and making the preparatory scrapes and cuts as appropriate, then put back on the conveyor system. If cutting station I is free, a loaded platen is diverted to it, otherwise it circulates. Platens that have passed through both cutting stations rejoin the conveyor system to be diverted at the unloading station to an unloading table 45 at which the wing pull is effected to separate the freed meat from the carcass and the wings unclamped and removed with the remains of the carcass for the now empty platen to return to circulation.

What is claimed is:

1. A procedure for use in deboning poultry comprising locating the prepared poultry carcass with its wingbones clamped on wingbone rests defining edges which abut the wingbones at their wing joint ends whereby the wingbones are securely held in fixed positions with the carcass depending therefrom, defining cutting axes between the wingbones and triosseum junctions, and cutting on said axes to sever tendons and ligaments.

2. A method for removing meat from poultry carcasses to which wings are attached by muscles, ligaments and tendons at wing joints, comprising:

supporting the carcass to depend from its wing joints with the wings clamped to wing bone rests on either side of the carcass affording fulcrums for the wing bones:

placing the wingbone rests under separation force to tension the ligaments and tendons at the wing joints;

cutting in a first cut selected muscles, ligaments and tendons permitting the wingbone rests further to separate to open out the wing joints whereby to reveal further muscles, ligaments and tendons;

locating such further muscles, ligaments and tendons and cutting in a second cut selected ones thereof; and completing the removal process by pulling the wings from the carcass and removing freed muscle therefrom.

3. A method according to claim 2, in which said first and second cuts are effected using oscillating blade means.

4. A method according to claim 3, in which the frequency of oscillation of the blade means is 1–150 Hz.

5. A method according to claim 3, in which the amplitude of oscillation of the blade means is 1–10 mm.

6. A method according to claim 3, in which the oscillation is primarily an oscillation lengthwise of a substantially straight blade edge.

7. A method according to claim 2, in which said first and second cuts are effected with blade means adapted to cut muscle tendon and ligament under tension but not bone.

8. A method according to claim 7, in which said blade means are between 1 and 2 mm thick at the cutting edge and have an angle of 30°–70° between faces at the cutting edge.

9. A method according to claim 2, in which the separation force is at any stage of the cutting sufficient to tension any muscle, tendon or ligament to be cut ahead of any other and such muscle, tendon and/or ligament having been cut, to separate the supports to open up the wing joints revealing further ligament, tendon and muscle facilitating further cutting.

10. A method according to claim 9, adapted for poultry in the weight range 1.2–2.4 Kg eviscerated weight, in which the separation force is 3–4 Kg.

11. A method according to claim 2, in which the first cuts are made at a predetermined distance from each of the respective fulcrums with blade means aligned transversely to a line joining the fulcrums.

12. A method according to claim 11, adapted for poultry in the weight range 1.2–2.4 Kg eviscerated weight, in which the predetermined distance is 7–9 mm.

13. A method according to claim 2, adapted for poultry in the weight range 1.2–2.4 Kg eviscerated weight, in which the first cuts are made 5 mm ahead of the front edge and 5 mm in from the end of the propatagium.

14. A method according to claim 13, in which the first cuts are continued until a fissure between 5 and 10 mm has opened when ligaments L1 have been completely severed.

15. A method according to claim 14, in which the first cuts are made to a predetermined height above the fulcrum calculated to ensure complete severing for all birds in the said weight range.

16. A method according to claim 14, in which the second cuts are effected with blade means inclined with respect to the blade means effecting the first cuts.

17. A method according to claim 16, in which the second cuts sever ligaments L2 and the deltoidus major and part the scapulohumeralis from the scapula.

18. A method according to claim 2, in which the first and second cuts are effected manually.

19. A method according to claim 1, in which the first and second cuts are effected automatically.

20. A method according to claim 19, in which the second cuts, the further muscles, ligaments and tendons are located by machine vision after the first cuts have opened up the wing joints to reveal ligaments L2.

21. A method according to claim 20, in which image analysis is used to position the second cuts.

22. A method according to claim 21, in which an edge detection algorithm is used.

23. A method according to claim 19, in which the first and second cuts are effected separately.

24. A method according to claim 23, in which the first cuts are effected at a first cutting station at which the positions of the wingbone rests are determined to position the first cuts.

25. A method according to claim 24, in which the carcass is moved to a second cutting station for the second cuts.

26. A method according to claim 19, in which the carcass is moved on the supports on a conveyor to and from a cutting station.

27. A method according to claim 26, in which the conveyor moves the wingbone rests from a loading, station through a cutting station to an unloading station.

28. A method according to claim 27, in which the wings and carcass are manipulated at the unloading station to separate muscle freed by the cutting operation from, the carcass.

29. A method according to claim 28, in which separation of meat from the carcass is completed manually at the unloading station.

30. A method according to claim 2, in which a carcass is prepared for cutting by removing the skin around the triosseum junction.

31. A method according to claim 2, in which blade cuts are effected down the scapula to separate the scapulohumeralis.

32. Apparatus for use in recovering meat from poultry carcasses to which wings are attached by muscles, ligaments and tendons at wing joints, comprising:

left and right wingbone rests affording fulcrums for the wingbones, the wingbone rests being relatively adjustable towards and away from each other whereby a carcass within a given weight range can be supported between the wingbone rests depending from the wing joints;

clamp means clamping the wings to the wingbone rests:

separation force means acting to tension the wing joints to hold the wingbone rests and supported carcass in equilibrium, facilitating severing of selected muscles, ligaments and tendons permitting the wingbone rests to move apart whereby to open up the wing joints to expose further muscles, ligaments and tendons for selective severing.

33. Apparatus according to claims 32, in which the left and right wingbone rests comprise vertically oriented plates, L-shaped in plan section, standing back-to-back.

34. Apparatus according to claim 32, in which at least one of the supports is slidable on a base.

35. Apparatus according to claim 32, in which said separation force means comprise fluid pressured operated piston-in-cylinder arrangements.

36. Apparatus according to claim 32, in which the clamp means are located on the wingbone rests between 30 and 35 mm below the fulcrum on the face of the "upright" of the L-section remote from the other L-section.

37. Apparatus according to any one of claims 32 to 36, comprising between the wingbone rests, a "cone" on which the carcass is placed serving to locate it for positioning and clamping of the wings.

38. Apparatus according to claim 37, in which the cone is elevatable whereby to rotate the wing joints after the severing operation to separate freed muscle from carcass.

39. Apparatus according to claim 38, the cone being mounted on a lever arrangement with a fluid pressure operated elevating arrangement.

40. Apparatus according to claim 32, adapted for automatic cutting, comprising blade means and blade guidance means.

41. Apparatus according to claim 40, in which the blade means comprise oscillating blade means.

42. Apparatus according to claim 41, in which the blade means comprise straight cutting edges oscillating lengthwise.

43. Apparatus according to claim 42, in which the blade edges are adapted to cut muscle, tendon and ligament under tension, but not bone, being between 1 and 2 mm thick at the cutting edge which has faces including an angle between 30° and 70°.

44. Apparatus according to claim 43, in which the blade edge has a thin sharp ridge projecting 1 mm from the apex of the faces.

45. Apparatus according to claim 41, in which the blades are double, reciprocating out of phase.

46. Apparatus according to claim 40, comprising blades carried on adjustable holders for movement in three dimensions above the left and right supports.

47. Apparatus according to claim 46, in which the blade guidance means position blades for a first cut with respect to the positions adopted by the right and left wingbone rests when the carcass is supported in equilibrium.

48. Apparatus according to claim 47, in which the blades are aligned with a line bisecting the left and right wingbone rests with their cutting edges 8 mm in toward the carcass measured from the place on the wingbone rest where the wing is clamped.

49. Apparatus according to claim 47, in which the blades are guided down to 15 mm above the fulcrum for the first cut.

50. Apparatus according to claim 40, in which the blade guidance means comprise a machine vision system.

51. Apparatus according to claim 50, in which the machine vision system images the wing joints after a first cut to determine guidance instructions for automatic control of the cutting means for a second cut.

52. Apparatus according to claim 51, in which the machine vision system includes an edge detection algorithm arrangement.

53. Apparatus according to claim 41, in which the blade means comprise composite blade means for extending the objectives of the first and second cuts to include separation of the Pectoralis thoracicus from the wishbone and the Scapulohumeralis from the scapula respectively.

54. Apparatus according to claim 53, in which the composite blade comprises a first edge for the first cut and a second edge for the second cut inclined with respect to the first edge.

55. Apparatus according to claim 51, in which the first and second cuts are effected by separate first and second blades.

56. Apparatus according to claim 32, in which the wingbone rests are on a movable base and comprising, transport means for moving the base between loading, cutting and unloading stations.

57. Apparatus according to claim 56, in which the base moves from a first cutting station to a second cutting station.

* * * * *